United States Patent Office 3,756,840
Patented Sept. 4, 1973

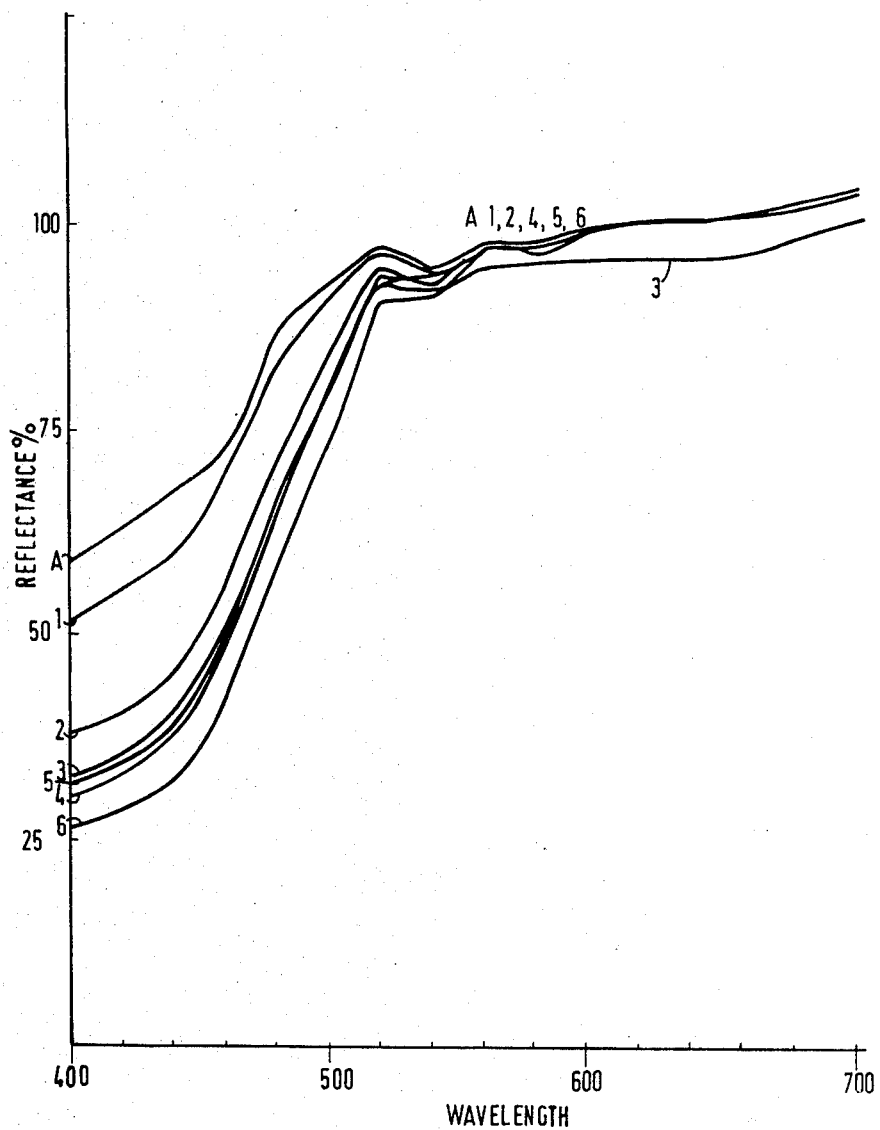

3,756,840
ZIRCONIUM PIGMENTS
Joseph Gascon, Thann, France, assignor to Fabriques de Produits Chimiques de Thann et de Mulhouse, Thann, Haut-Rhin, France
Filed Apr. 21, 1971, Ser. No. 135,905
Claims priority, application Great Britain, Apr. 22, 1970, 19,364/70
The portion of the term of the patent subsequent to Sept. 15, 1987, has been disclaimed
Int. Cl. C09c 1/00, 1/28
U.S. Cl. 106—299
12 Claims

ABSTRACT OF THE DISCLOSURE

Praseodymium yellow zircon based pigments are prepared by calcining at below 900° C. a mixture of an alkali metal silicozirconate, a basic zirconium sulphate, free silica or silicic acid, a mineraliser and praseodymium oxide, the silicozirconate being present in a stoichiometric excess, e.g. 10–50 molar percent, with respect to the basic zirconium sulphate. The zirconium sulphate is preferably of formula $(ZrO_2)_2.SO_3$ and may be prepared by reacting the silicozirconate with sulphuric acid. Glazes containing the pigments are of superior quality to those containing pigments derived from smaller quantities of silicozirconate.

---

This invention relates to the production of yellow pigments having a basis of zirconium silicate (zircon) and comprising praseodymium oxide as a colouring agent.

It has been proposed to make said zirconium pigments by forming a mixture of sodium silicozirconate, basic zirconium sulphate and silicic acid, together with praseodymium oxide, a mineraliser and a sulphate, e.g. ammonium sulphate or lead sulphate, and calcining the mixture at a temperature above 900° C., the relative proportions of sodium silicozirconate and basic zirconium sulphate being 25–35 parts and 45–52 parts respectively. (Parts are by weight.) These proportions correspond to a stoichiometric excess of basic zirconium sulphate over sodium silicozirconate.

We have now found that by a suitable choice of operating conditions and proportions of the reactants it is possible to make zircon-based pigments from sodium silicozirconate and basic zirconium sulphate using an calcining temperature below 900° C.; in particular the sodium silicozirconate is used in stoichiometric excess over the basic zirconium sulphate, and since the former compound is the cheaper material, this adds a further economic advantage to that which already exists for the use of the lower calcining temperature.

According to the present invention therefore a praseodymium yellow zircon-based pigment is made by calcining at a temperature below 900° C. a mixture of an alkali metal silicozirconate, basic zirconium sulphate, silica or silicic acid, mineraliser, and praseodymium oxide or a praseodymium compound yielding the oxide under the calcination conditions, the alkali metal silicozirconate being present in a stoichiometric excess with respect to the basic zirconium sulphate. As the mineraliser it is preferred to use fluorine and chlorine (in the form of ammonium chloride) as more fully explained below.

For the purpose of calculating whether an excess of silicozirconate is present it may be assumed that the reactions taking place involving the silicozirconate, typically sodium silicozirconate, can be represented as follows:

(1) 
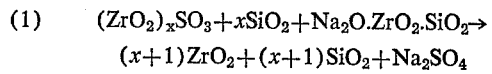

($x$ being a small number)

(2) $2NH_4Cl + Na_2O.ZrO_2.SiO_2 \rightarrow$ $2NaCl + SiO_2 + ZrO_2 + 2NH_3 + H_2O$ Stoichiometrically therefore, when the basic zirconium sulphate is the best known compound of this kind, $(ZrO_2)_2.SO_3$, one molar proportion of sodium silicozirconate is equivalent to one molar proportion of basic zirconium sulphate, and the molar ratio of alkali metal silicozirconate to basic zirconium sulphate should be more than 2:1, preferably by 10–50 molar percent. If the ratio $ZrO_2:SO_3$ in the basic zirconium sulphate is other than 2:1 the said molar ratio will differ correspondingly, but the degree of excess is preferably still 10–50 molar percent.

The alkali metal silicozirconate employed will for economic reasons usually be sodium silicozirconate, and the invention will be more particularly described by reference to this compound. It may be prepared conveniently by calcining natural zircon or zirconium silicate at 850°–950° C. in the presence of an equimolar amount or a slight excess e.g. (up to 2 or 3%) of sodium (or other alkali metal) carbonate.

The basic zirconium sulphates are known compounds. One particularly preferred compound has the formula $(ZrO_2)_2.SO_3.nH_2O$ ($n$ being a small whole number, and is described in British patent specification No. 1,060,223.

According to a further aspect of the invention, the basic zirconuim sulphate may be obtained by treating an alkali metal silicozirconate with sulphuric acid. This reaction may be carried out in the presence of small amounts of water and by appropriate selection of the proportions of silicozirconate and acid. The mixture obtained after reaction and drying the reaction product can be a mixture of silicozirconate and basic zirconium sulphate in proportions suitable for use in the present process. In particular, by using an appropriate excess of silicozirconate, the dried silicozirconate/basic zirconium sulphate can contain the desired 10–50 molar percent excess of the silicozirconate. In this procedure, all the zirconium originates from the silicozirconate and the sulphate of the basic zirconium sulphate originates from the sulphuric acid.

The yellow colour is introduced by the oxide of praseodymium or the compound yielding an oxide of praseodymium under the calcination conditions. The yellow colour is produced in the final enamel or glaze containing the pigment, and the colour in the final glaze or enamel may differ somewhat from the colour of the pigment itself. The particular colour agents which are used can be such as are already known for this purpose, including oxides, hydroxides, halides, sulphates, and salts in which the metal is present in the anion. Thus a suitable source of praseodymium is the oxide $Pr_2O_3$ or $Pr_6O_{11}$. When a sulphate is used, its —$SO_3$ content, though relatively small, should be allowed for in selecting the amounts of the various reactants to be used in the main reaction. The amount of colouring agent used will depend on the depth of colour desired.

It is preferred to select the proportions of the various materials so that the alkali metal ion content and sulphate ion content are stoichiometrically approximately equivalent, and that substantially equimolar amounts of $ZrO_2$ and $SiO_2$ are present, taking into account both the free and the combined forms of these oxides.

As mineraliser a fluorine-containing compound will normally be employed, e.g. hydrogen fluoride, sodium fluoride or sodium silicofluoride and preferably a chlorine-containing compound is used also.

The fluorine to be used as a mineraliser is preferably added to a zirconium compound which is to be converted into the basic zirconium sulphate used as a starting mate rial. Thus it may be added, preferably as hydrogen fluoride or a soluble salt thereof, to a zirconium oxychloride solution obtained as an intermediate in the production of a basic zirconium sulphate as described in our British patent specification No. 1,060,223, so that it is included in the basic zirconium sulphate precipitated. Alternatively a solid fluoride may be added as a wet paste to the sodium silicozirconate before it is dissolved in hydrochloric acid to form the oxychloride solution from which the basic sulphate is precipitated. While the above methods are convenient and effective, other methods of incorporating the fluorine in the basic zirconium sulphate can be employed if desired. The amount of fluorine can be varied within the usual limits for such use, but is preferably from 0.5 to 2.5% of the total weight of free and combined $SiO_2$ and $ZrO_2$. While the fluoride can be added at a later stage in the process, this is definitely less advantageous.

When, as is preferred, chlorine is used as an additional mineraliser, it is preferred to add it in the form of a volatile compound, particularly ammonium chloride; ammonium chloride may be used in amount 6–9%, and preferably 7–8%, by weight based on the total free and combined $SiO_2$ and $ZrO_2$, and any other chlorine source in an equivalent amount. It will be understood that the sodium silicozirconate which reacts with ammonium chloride (or another chlorine source) as shown in Equation 2 above is to be taken into account in calculating the amount of silicozirconate required to give the desired excess over the basic zirconium sulphate.

As stated above, it is an essential feature of the invention that the mixture is calcined at a temperature below 900° C. Preferably the calcination temperature does not exceed 880° C., temperatures within the range 860°–880° C. being particularly useful. Conventional calcining times are generally satisfactory; for example 1½ hours will usually suffice at temperatures of 860°–880° C. The pigment obtained by the calcination should be freed from soluble by-products such as sodium sulphate, as by washing with water, and then ground as required.

Pigments produced in accordance with the invention are useful especially in ceramics and for other applications in which resistance to high temperatures is required, in particular in enamels and glazes. They are characterised inter alia by giving a high colour intensity for a given content of colouring agent.

The invention is illustrated by the following examples.

EXAMPLE 1

54 g. of a sodium silicozirconate frit of $Na_2O$ content 25% are intimately dry mixed in using a powder mixer containing 46 g. of basic zirconium sulphate of $ZrO_2$ content 60% and fluoride ion content about 1.5 (obtained by the process described in British patent specification No. 1,060,223), 13.8 g. of finely powdered (micronised) quartz, 10 g. of powdered ammonium chloride and 2.3 g. of praseodymium oxide $Pr_6O_{11}$. (The excess of sodium silicozirconate over basic zirconium sulphate was 6.7%, allowing for the ammonium chloride added subsequently.)

The resulting mixture was calcined in a closed sagger heated in a muffle furnace, the temperature being raised by about 170° C./hour until it reached 860° C., at which level it was held for 1½ hours.

The calcined pigment material was then cooled, and washed with water until free of water-soluble sodium salts, ground, filtered off and dried, giving a yellow pigment suitable for use in enamels and having the physical properties characteristic of the zircon pigments.

EXAMPLES 2–5

The process of Example 1 was repeated, using the proportions of the various starting materials shown in the following table. In each case a good yellow pigment suitable for use in enamels was obtained.

| Example | 2 | 3 | 4 | 5 |
|---|---|---|---|---|
| (a) Sodium silicozirconate, g | 54 | 61 | 66 | 71.0 |
| (b) Basic zirconium sulphate, g | 41.5 | 41.5 | 41.5 | 41.5 |
| Excess of (a) over (b), percent | 12.5 | 27 | 37 | 48 |
| Quartz, g | 12.5 | 12.5 | 12.5 | 12.5 |
| Ammonium chloride, g | 10 | 10 | 10 | 10.0 |
| Praseodymium oxide, g | 2.2 | 2.3 | 2.4 | 2.5 |

EXAMPLE 6

A paste was formed by mixing together 1110 g. of the sodium silicozirconate employed in Examples 1–5, 32 g. of sodium silicofluoride $Na_2SiF_6$ and 100 cc. of water. To this paste 180 cc. of 92% sulphuric acid was added slowly. The excess of sodium silicozirconate over the sulphuric acid and over ammonium chloride added subsequently was 13%. The mixture was then dried and ground. 100 g. of ammonium chloride and 23 g. of praseodymium oxide were added to and intimately mixed with the ground mass (about 1450 g.), using a powder mixer. The calcination and subsequent operations were carried out as described in Example 1, and again a yellow pigment useful in enamels was obtained.

The invention is further illustrated in the accompanying drawing, which is a graphical representation of the variation of reflectance with wavelength of enamels made from the pigments of the invention and from one control pigment obtained by a process in which the basic zirconium sulphate is employed in excess over the sodium silicozirconate.

The curves in the drawing are identified as A, 1, 2, 3, 4, 5 and 6. Curve A relates to enamelled tiles obtained using a pigment made by the general procedure described in Examples 1–6 but using 45.9 g. of the basic zirconium sulphate, 29.8 g. of the sodium silicozirconate frit, 14.2 g. of the quartz, 0.8 g. ammonium sulphate, 2.1 g. sodium fluoride, 2.7 g. sodium chloride and 1.9 g. praseodymium oxide. In this mixture the zirconium sulphate is present in excess over the silicozirconate. Curves 1–6 refer to enamelled tiles obtained using the pigments obtained in the example of the same number. It will be seen that the quality of the yellow enamels obtained by the process of the invention is in all cases superior to that of the yellow obtained using the known pigment.

The tiles were obtained in the ordinary way, using 5% by weight of pigment in a frit opacified with zircon.

I claim:
1. A process for the production of a praseodymium yellow zircon based pigment which comprises calcining at a temperature below 900° C. a mixture of an alkali metal silicozirconate, a basic zirconium sulphate, free silica or silicic acid, a mineraliser and praseodymium oxide or a praseodymium compound yielding the oxide under the calcination conditions, the alkali metal silicozirconate being present in a stoichiometric excess with respect to the basic zirconium sulphate.

2. A process according to claim 1 wherein the mixture is calcined at 860–880° C.

3. A process according to claim 1 wherein the alkali metal silicozirconate is present in an amount of 10–50 molar percent in excess of the stoichiometric amount with respect to the basic zirconium sulphate.

4. A process according to claim 1 wherein the basic zirconium sulphate used has the formula $(ZrO_2)_2.SO_3$.

5. A process according to claim 1 wherein the mixture contains praseodymium oxide of formula $Pr_6O_{11}$.

6. A process according to claim 1 wherein the relative proportions of alkali metal silicozirconate, basic zirconium sulphate and free silica or silicic acid are selected such that the alkali metal ion content and the sulphate ion content of the mixture are substantially stoichiometrically equivalent and the mixture contains substantially equimolar quantities of $ZrO_2$ and $SiO_2$, taking into account both the free and combined forms of these oxides.

7. A process according to claim 1 wherein the mixture of alkali metal silicozirconate and basic zirconium sulphate is obtained by treating an alkali metal silicozirconate with sulphuric acid.

8. A process according to claim 1 wherein the alkali metal silicozirconate is sodium silicozirconate.

9. A process according to claim 1 wherein the mixture contains hydrogen fluoride, sodium fluoride or sodium silicofluoride as mineraliser in an amount of 0.5–2.5% by weight fluorine based on the total weight of free and combined $ZrO_2$ and $SiO_2$.

10. A process according to claim 9 wherein the mixture contains ammonium chloride as an additional mineraliser in an amount of 6–9% by weight chlorine based on the total weight of free and combined $ZrO_2$ and $SiO_2$.

11. A process according to claim 1 wherein a dry mixture of sodium silicozirconate, basic zirconium sulphate of formula $(ZrO_2)_2SO_3$, and containing fluoride ion, silica, ammonium chloride and praseodymium oxide of formula $Pr_6O_{11}$ is calcined at about 860° C. for about 1½ hours, the relative proportions of sodium silicozirconate, basic zirconium sulphate and ammonium chloride being such that there is sufficient sodium silicozirconate present to provide a 10–50 molar percent in excess of the amount required to react with the basic zirconium sulphate and ammonium chloride.

12. A process according to claim 1 wherein an aqueous paste of sodium silicozirconate containing sodium silicofluoride is reacted with sulphuric acid, the reaction product is dried, ammonium chloride and praseodymium oxide of formula $Pr_6O_{11}$ added to the dried reaction product and the resulting mixture calcined at about 860° C. for about 1½ hours, the relative proportions of sodium silicozirconate, sulphuric acid and ammonium chloride being such that there is sufficient sodium silicozirconate present in the mixture to be calcined to provide a 10–50 molar percent in excess of the amount required to react with ammonium chloride and the basic zirconium sulphate formed by reaction between the sodium silicozirconate and the sulphuric acid.

References Cited
UNITED STATES PATENTS

| | | | |
|---|---|---|---|
| 3,528,835 | 9/1970 | Gascon | 106—299 |
| 3,510,332 | 5/1970 | Weber | 106—299 |

JAMES E. POER, Primary Examiner